United States Patent
Lin et al.

(10) Patent No.: US 9,572,133 B2
(45) Date of Patent: Feb. 14, 2017

(54) SUB-FRAME CONFIGURATION

(75) Inventors: Jie Zhen Lin, Beijing (CN); Peter Skov, Beijing (CN); Jiang Chang, Beijing (CN); Chunli Wu, Beijing (CN); Chun Hai Yao, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 13/885,535

(22) PCT Filed: Nov. 15, 2010

(86) PCT No.: PCT/CN2010/078717
§ 371 (c)(1),
(2), (4) Date: May 15, 2013

(87) PCT Pub. No.: WO2012/065287
PCT Pub. Date: May 24, 2012

(65) Prior Publication Data
US 2013/0242823 A1    Sep. 19, 2013

(51) Int. Cl.
H04W 72/04    (2009.01)
H04W 99/00    (2009.01)
(Continued)

(52) U.S. Cl.
CPC ....... *H04W 72/0406* (2013.01); *H04B 7/2656* (2013.01); *H04W 99/00* (2013.01); *H04W 48/08* (2013.01); *H04W 72/12* (2013.01)

(58) Field of Classification Search
USPC .............. 370/203, 277, 280, 281, 282, 294, 295,370/329, 345
See application file for complete search history.

(56) References Cited

U.S. PATENT DOCUMENTS

2007/0049344 A1* 3/2007 Van Der Velde ..... H04W 48/12
                                                            455/560
2009/0175245 A1   7/2009 Harada et al.
(Continued)

FOREIGN PATENT DOCUMENTS

CN    101796739 A    8/2010
EP    2 641 343       9/2013
(Continued)

OTHER PUBLICATIONS

3GPP TS 36.101 V9.5.0 (Oct. 2010), "3rd Generation Partnership Project; Technical Specification Group Radio Access Network; Evolved Universal Terrestrial Radio Access (E-UTRA); User Equipment (UE) radio transmission and reception (Release 9)", 187 pgs.
(Continued)

*Primary Examiner* — Edan Orgad
*Assistant Examiner* — Saumit Shah
(74) *Attorney, Agent, or Firm* — Harrington & Smith

(57) ABSTRACT

The exemplary embodiments of the invention provide at least a method and apparatus to perform operations including transmitting an indication of a default configuration for a sub-frame having a downlink transmission portion and an uplink transmission portion; transmitting an indication of a preferred configuration for said sub-frame; and scheduling at least one of transmissions to and transmissions from a communication device according to said preferred sub-frame configuration.

19 Claims, 13 Drawing Sheets

(51) Int. Cl.
  *H04B 7/26*    (2006.01)
  *H04W 48/08*   (2009.01)
  *H04W 72/12*   (2009.01)

(56) References Cited

U.S. PATENT DOCUMENTS

| | | | |
|---|---|---|---|
| 2009/0296609 A1 | 12/2009 | Choi et al. | 370/281 |
| 2010/0232373 A1* | 9/2010 | Nory et al. | 370/329 |
| 2010/0238845 A1* | 9/2010 | Love | H04B 7/15528 370/280 |
| 2010/0238847 A1 | 9/2010 | Suo et al. | 370/280 |
| 2010/0260164 A1* | 10/2010 | Moon et al. | 370/345 |
| 2013/0176919 A1 | 7/2013 | Pan et al. | |
| 2013/0242823 A1 | 9/2013 | Lin et al. | 370/280 |

FOREIGN PATENT DOCUMENTS

| | | | |
|---|---|---|---|
| JP | 2007336494 A | 12/2007 | |
| RU | 2007/139904 A | 5/2009 | |
| WO | WO 2006/102746 A1 | 10/2006 | |
| WO | WO 2009/012272 A2 | 1/2009 | |
| WO | WO 2009/052752 A1 | 4/2009 | |
| WO | WO 2009/070602 A2 | 6/2009 | |
| WO | WO 2009/089287 A2 | 6/2009 | |
| WO | WO 2009/102180 A1 | 8/2009 | |
| WO | WO 2009/137646 A2 | 11/2009 | |
| WO | WO 2009/157699 A2 | 12/2009 | |
| WO | WO 2010/009645 A1 | 1/2010 | |
| WO | WO 2010/074423 A2 | 7/2010 | |
| WO | WO 2010/078590 A1 | 7/2010 | |
| WO | WO 2010086498 A1 * | 8/2010 | H04W 72/04 |

OTHER PUBLICATIONS

3GPP TS36.212 V9.3.0 (Sep. 2010), "3$^{rd}$ Generation Partnership Project; Technical Specification Group Radio Access Network; Evolved Universal Terrestrial Radio Access (E-UTRA); Multiplexing and channel coding (Release 9)", 61 pgs.

3GPP TS36.304 V9.4.0 (Sep. 2010), 3$^{rd}$ Generation Partnership Project; Technical Specification Group Radio Access Network; Evolved Universal Terrestrial Radio Access (E-UTRA); User Equipment (UE) procedures in idle mode (Release 9), 32 pgs.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Figure 9

*TDD-Config* information element

```
-- ASN1START

TDD-Config ::=              SEQUENCE {
    subframeAssignment          ENUMERATED {
                                    sa0, sa1, sa2, sa3, sa4, sa5, sa6},
    specialSubframePatterns     ENUMERATED {
                                    ssp0, ssp1, ssp2, ssp3, ssp4, ssp5, ssp6, ssp7,
                                    ssp8}
}

-- ASN1STOP
```

Figure 12

| Special subframe configuration | Normal cyclic prefix in downlink | | | Extended cyclic prefix in downlink | | |
|---|---|---|---|---|---|---|
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| 0 | 3 | | | 3 | | |
| 1 | 9 | 1 | 1 | 8 | 1 | 1 |
| 2 | 10 | | | 9 | | |
| 3 | 11 | | | 10 | | |
| 4 | 12 | | | 3 | 2 | 2 |
| 5 | 3 | 2 | 2 | 8 | | |
| 6 | 9 | | | 9 | | |
| 7 | 10 | - | - | - | - | - |
| 8 | 11 | - | - | - | - | - |

Figure 10

FOR NORMAL CP

| D | D | D | D | D | D | G | G | G | G | G | G | U | U |

| D | D | D | D | D | D | G | G | U | U | U | U | U | U |

| D | D | D | D | D | D | G | U | U | U | U | U | U | U |

| D | D | D | G | G | G | G | G | G | G | G | U | U | U |

FOR EXTENDED CP

| D | D | D | D | D | G | G | G | G | G | U | U |

Figure 11

*SystemInformationBlockType1 message*

```
-- ASN1START

SystemInformationBlockType1 ::=      SEQUENCE {
    cellAccessRelatedInfo                SEQUENCE {
        plmn-IdentityList                    PLMN-IdentityList,
        trackingAreaCode                     TrackingAreaCode,
        cellIdentity                         CellIdentity,
        cellBarred                           ENUMERATED {barred, notBarred},
        intraFreqReselection                 ENUMERATED {allowed, notAllowed},
        csg-Indication                       BOOLEAN,
        csg-Identity                         CSG-Identity             OPTIONAL      -- Need OR
    },
    cellSelectionInfo                    SEQUENCE {
        q-RxLevMin                           Q-RxLevMin,
        q-RxLevMinOffset                     INTEGER (1..8)           OPTIONAL      -- Need OP
    },
    p-Max                                P-Max                        OPTIONAL,                 -- Need OP
    freqBandIndicator                    INTEGER (1..64),
    schedulingInfoList                   SchedulingInfoList,
    tdd-Config                           TDD-Config                   OPTIONAL,     -- Cond TDD
    si-WindowLength                      ENUMERATED {
                                             ms1, ms2, ms5, ms10, ms15, ms20,
                                             ms40},
    systemInfoValueTag                   INTEGER (0..31),
    nonCriticalExtension                 SystemInformationBlockType1-v890-IEs
                                                                      OPTIONAL
}

SystemInformationBlockType1-v890-IEs::= SEQUENCE {
    lateNonCriticalExtension             OCTET STRING                 OPTIONAL,     -- Need OP
    nonCriticalExtension                 SystemInformationBlockType1-v920-IEs    OPTIONAL
}

SystemInformationBlockType1-v920-IEs ::=    SEQUENCE {
    ims-EmergencySupport-r9              ENUMERATED {true}            OPTIONAL,     -- Need OR
    cellSelectionInfo-v920               CellSelectionInfo-v920                     OPTIONAL,    -- Need OP
    nonCriticalExtension                 SEQUENCE {}                                OPTIONAL     -- Need OP
}

PLMN-IdentityList ::=                SEQUENCE (SIZE (1..6)) OF PLMN-IdentityInfo PLMN-IdentityInfo ::=                SEQUENCE {
    plmn-Identity                        PLMN-Identity,
    cellReservedForOperatorUse           ENUMERATED {reserved, notReserved}
}

SchedulingInfoList ::= SEQUENCE (SIZE (1..maxSI-Message)) OF SchedulingInfo

SchedulingInfo ::=   SEQUENCE {
    si-Periodicity                       ENUMERATED {
                                             rf8, rf16, rf32, rf64, rf128, rf256, rf512},
    sib-MappingInfo                      SIB-MappingInfo
}

SIB-MappingInfo ::= SEQUENCE (SIZE (0..maxSIB-1)) OF SIB-Type

SIB-Type ::=                         ENUMERATED {
                                         sibType3, sibType4, sibType5, sibType6,
                                         sibType7, sibType8, sibType9, sibType10,
                                         sibType11, sibType12-v920, sibType13-v920, spare5,
                                         spare4, spare3, spare2, spare1, ...}

CellSelectionInfo-v920 ::=           SEQUENCE {
    q-QualMin-r9                         Q-QualMin-r9,
    q-QualMinOffset-r9                   INTEGER (1..8)               OPTIONAL      -- Need OP
}

-- ASN1STOP
```

Figure 13

*PhysicalConfigDedicated information element*

```
-- ASN1START

PhysicalConfigDedicated ::=      SEQUENCE {
    pdsch-ConfigDedicated           PDSCH-ConfigDedicated       OPTIONAL,       -- Need ON
    pucch-ConfigDedicated           PUCCH-ConfigDedicated       OPTIONAL,       -- Need ON
    pusch-ConfigDedicated           PUSCH-ConfigDedicated       OPTIONAL,       -- Need ON
    uplinkPowerControlDedicated     UplinkPowerControlDedicated OPTIONAL,       -- Need ON
    tpc-PDCCH-ConfigPUCCH           TPC-PDCCH-Config            OPTIONAL,       -- Need ON
    tpc-PDCCH-ConfigPUSCH           TPC-PDCCH-Config            OPTIONAL,       -- Need ON
    cqi-ReportConfig                CQI-ReportConfig            OPTIONAL,       -- Need ON
    soundingRS-UL-ConfigDedicated   SoundingRS-UL-ConfigDedicated OPTIONAL,     -- Need ON
    antennaInfo                     CHOICE {
        explicitValue                   AntennaInfoDedicated,
        defaultValue                    NULL
    }                                                           OPTIONAL,       -- Need ON
    schedulingRequestConfig         SchedulingRequestConfig     OPTIONAL,       -- Need ON
    ...,
    [[ cqi-ReportConfig-v920            CQI-ReportConfig-v920       OPTIONAL,       -- Need ON
       antennaInfo-v920                 AntennaInfoDedicated-v920   OPTIONAL,       -- Need ON
       NewSSFpattern                    ENUMERATED {
                                        ssp9, ssp10, ssp11, ...}    OPTIONAL        -- Need ON

]]
}

-- ASN1STOP
```

Figure 14

*SystemInformationBlockType2 message*

```
-- ASN1START

SystemInformationBlockType2 ::=    SEQUENCE {
    ac-BarringInfo                 SEQUENCE {
        ac-BarringForEmergency         BOOLEAN,
        ac-BarringForMO-Signalling     AC-BarringConfig         OPTIONAL,    -- Need OP
        ac-BarringForMO-Data           AC-BarringConfig         OPTIONAL     -- Need OP
    }                                                           OPTIONAL,    -- Need OP
    radioResourceConfigCommon      RadioResourceConfigCommonSIB,
    ue-TimersAndConstants          UE-TimersAndConstants,
    freqInfo                       SEQUENCE {
        ul-CarrierFreq                 ARFCN-ValueEUTRA         OPTIONAL,    -- Need OP
        ul-Bandwidth                   ENUMERATED {n6, n15, n25, n50, n75, n100}
                                                                OPTIONAL,    -- Need OP
        additionalSpectrumEmission     AdditionalSpectrumEmission
    },
    mbsfn-SubframeConfigList       MBSFN-SubframeConfigList     OPTIONAL,    -- Need OR
    timeAlignmentTimerCommon       TimeAlignmentTimer,
    ...,
    lateR8NonCriticalExtension     OCTET STRING                 OPTIONAL,    -- Need OP
    [[ ssac-BarringForMMTEL-Voice-r9    AC-BarringConfig         OPTIONAL,    -- Need OP
       ssac-BarringForMMTEL-Video-r9    AC-BarringConfig         OPTIONAL     -- Need OP
    ]]
    NewSSFpattern                  ENUMERATED {
                                       ssp9, ssp10, ssp11, ...}  OPTIONAL    -- Need ON

}

AC-BarringConfig ::=               SEQUENCE {
    ac-BarringFactor                   ENUMERATED {
                                           p00, p05, p10, p15, p20, p25, p30, p40,
                                           p50, p60, p70, p75, p80, p85, p90, p95},
    ac-BarringTime                     ENUMERATED {s4, s8, s16, s32, s64, s128, s256, s512},
    ac-BarringForSpecialAC             BIT STRING (SIZE(5))
}

MBSFN-SubframeConfigList ::=       SEQUENCE (SIZE (1..maxMBSFN-Allocations)) OF MBSFN-
SubframeConfig

-- ASN1STOP
```

Figure 15

SUB-FRAME CONFIGURATION

The present invention relates to communicating information about sub-frame configuration for time-division duplex (TDD) mode transmissions.

A communication device can be understood as a device provided with appropriate communication and control capabilities for enabling use thereof for communication with others parties. The communication may comprise, for example, communication of voice, electronic mail (email), text messages, data, multimedia and so on. A communication device typically enables a user of the device to receive and transmit communication via a communication system and can thus be used for accessing various service applications.

A communication system is a facility which facilitates the communication between two or more entities such as the communication devices, network entities and other nodes. A communication system may be provided by one or more interconnect networks. One or more gateway nodes may be provided for interconnecting various networks of the system. For example, a gateway node is typically provided between an access network and other communication networks, for example a core network and/or a data network.

An appropriate access system allows the communication device to access to the wider communication system. An access to the wider communications system may be provided by means of a fixed line or wireless communication interface, or a combination of these. Communication systems providing wireless access typically enable at least some mobility for the users thereof. Examples of these include wireless communications systems where the access is provided by means of an arrangement of cellular access networks. Other examples of wireless access technologies include different wireless local area networks (WLANs) and satellite based communication systems.

A wireless access system typically operates in accordance with a wireless standard and/or with a set of specifications which set out what the various elements of the system are permitted to do and how that should be achieved. For example, the standard or specification may define if the user, or more precisely user equipment, is provided with a circuit switched bearer or a packet switched bearer, or both. Communication protocols and/or parameters which should be used for the connection are also typically defined. For example, the manner in which communication should be implemented between the user equipment and the elements of the networks and their functions and responsibilities are typically defined by a predefined communication protocol. Such protocols and or parameters further define the frequency spectrum to be used by which part of the communications system, the transmission power to be used etc.

In the cellular systems a network entity in the form of a base station provides a node for communication with mobile devices in one or more cells or sectors. It is noted that in certain systems a base station is called 'NodeB (NB)' or "eNodeB (eNB)". Typically the operation of a base station apparatus and other apparatus of an access system required for the communication is controlled by a centralised control entity (which centralised control entity is typically interconnected with other centralised control entities of the particular communication network), or every base station (e.g. eNodeB) contains its own local control entity. Examples of cellular access systems include, in order of their evolution, GSM (Global System for Mobile) EDGE (Enhanced Data for GSM Evolution) Radio Access Networks (GERAN), Universal Terrestrial Radio Access Networks (UTRAN) and evolved UTRAN (E-UTRAN).

With reference to FIG. 8, according to Long Term Evolution (LTE) for E-UTRAN, downlink and uplink transmissions are organised into radio frames of a specified duration, each frame consisting of consecutive sub-frames, and each sub-frame consisting of a number of consecutive orthogonal frequency division multiplexing (OFDM) symbols.

In the TDD mode, a single bandwidth is shared between uplink and downlink transmissions, and different time resources are allocated to uplink and downlink.

There are a number of different ways of sharing the sub-frames within a frame between uplink and downlink transmissions, but they are each characterised by the use of at least one special sub-frame (SSF) that contains both portions of downlink, i.e. DwPTS and uplink transmissions i.e. UpPTS separated by a portion of unused symbols in the middle of the sub-frame i.e GP. According to one proposal, the lengths (in terms of OFDM symbols) of the uplink and downlink portions can take one of a limited number of combinations, and the specific combination selected at the network side for a cell is communicated to the communication devices served by that cell in a TDD-Config information element.

It has been proposed to increase the number of possible special subframe configurations for some relatively advanced communication devices with the aim of increasing transmission capacity; and there has been identified the challenge of communicating special sub-frame configuration information in such a developed system involving communication devices of differing capabilities.

It is an aim to meet this challenge.

There is provided <WORDING OF CLAIMS TO BE COPIED HERE ONCE FINALISED>

Hereunder is provided, by way of example only, a detailed description of techniques related to the encoding and decoding of feedback information, with reference to the accompany drawings, in which:

FIG. 9 illustrates examples of uplink-downlink configurations for a radioframe for LTE TDD;

FIG. 10 illustrates one set of special sub-frame (SSF) configurations (SSCs) and the SSF parameter values that are used to identify each configuration in a "TDD-Config" information element;

FIG. 11 illustrates examples of additional sub-frame configurations (SSCs);

FIG. 12 illustrates an example of a TDD-Config information element;

FIG. 13 illustrates an example of a System Information Block Type 1 message including a TDD-Config element;

FIG. 14 illustrates an example of a Physical Config Dedicated information element for a RRC Connection Reconfiguration message including an indication of a preferred SSF configuration; and FIG. 15 illustrates an example of a System Information Block Type 2 message including an indication of a preferred SSF configuration.

The following description relates to the example of a communication system including a radio access network designed to operate in accordance with Long Term Evolution (LTE) Release 10/11 or beyond.

Figure 1:
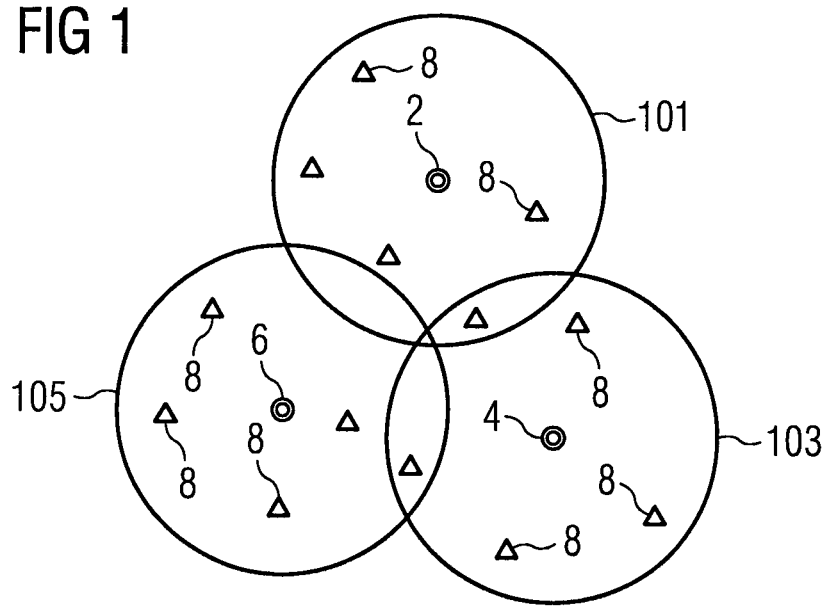
FIG. 1 illustrates an example of a communication system including a radio access network.

FIG. 1 illustrates an example of a cellular E-UTRAN including a network of base stations 2, 4, 6 (eNBs).

For simplicity, only three cells are shown in FIG. 1, but a large cellular radio access network can have tens of thousands of cells.

Figure 2:
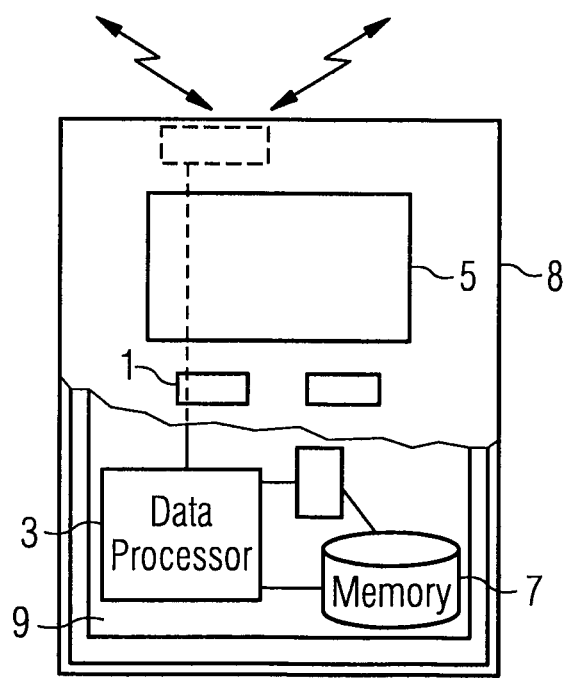
FIG. 2 illustrates some components of one example of user equipment as shown in FIG. 1.

FIG. 2 illustrates some components of one example of user equipment as shown in FIG. 1. The user equipment (UE) 8 may be used for various tasks such as making and receiving phone calls, for receiving and sending data from and to a data network and for experiencing, for example, multimedia or other content.

The UE 8 may be any device capable of at least sending or receiving radio signals. Non-limiting examples include a mobile station (MS), a portable computer provided with a wireless interface card or other wireless interface facility, personal data assistant (FDA) provided with wireless communication capabilities, a relay node, or any combinations of these or the like. The UE 8 may communicate via an appropriate radio interface arrangement of the UE 8. The interface arrangement may be provided for example by means of a radio part and associated antenna arrangement. The antenna arrangement may be arranged internally or externally to the UE 8.

The UE 8 may be provided with at least one data processing entity 3 and at least one memory or data storage entity 7 for use in tasks it is designed to perform. The data processor 3 and memory 7 may be provided on an appropriate circuit board 9 and/or in chipsets.

The user may control the operation of the UE 8 by means of a suitable user interface such as key pad 1, voice commands, touch sensitive screen or pad, combinations thereof or the like. A display 5, a speaker and a microphone may also be provided. Furthermore, the UE S may comprise appropriate connectors (either wired or wireless) to other devices and/or for connecting external accessories, for example hands-free equipment, thereto.

Figure 3:
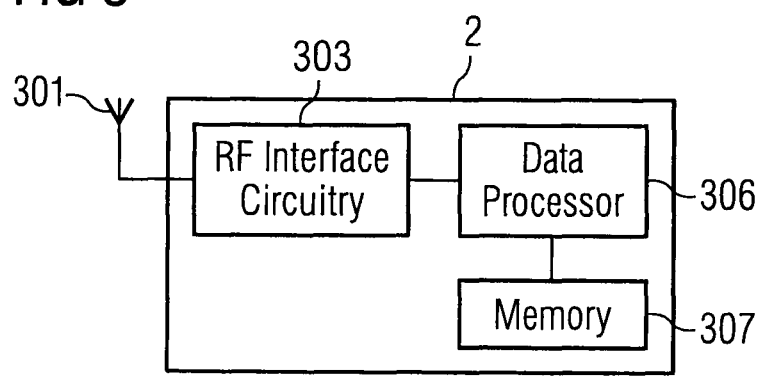
FIG. 3 illustrates some components of an example of an apparatus suitable for the access nodes shown in FIG. 1.

FIG. 3 illustrates some components of an example of an apparatus suitable for the access nodes 2, 4, 6 shown in FIG. 1. The apparatus 2 may comprise a radio frequency antenna 301 configured to receive and transmit radio frequency signals, radio frequency interface circuitry 303 configured to interface the radio frequency signals received and transmitted by the antenna 301. The radio frequency interface circuitry may also be known as a transceiver. The apparatus 2 may also comprise a data processor 306 configured to process signals from the radio frequency interface circuitry 303, control the radio frequency interface circuitry 303 to generate suitable RF signals. The access node may further comprise a memory 307 for storing data, parameters and instructions for use by the data processor 306.

It will be understood that both the UE 8 and access nodes shown in FIGS. 2 and 3 respectively and described above may comprise further elements which are not directly involved with the embodiments described hereafter.

Figure 4:
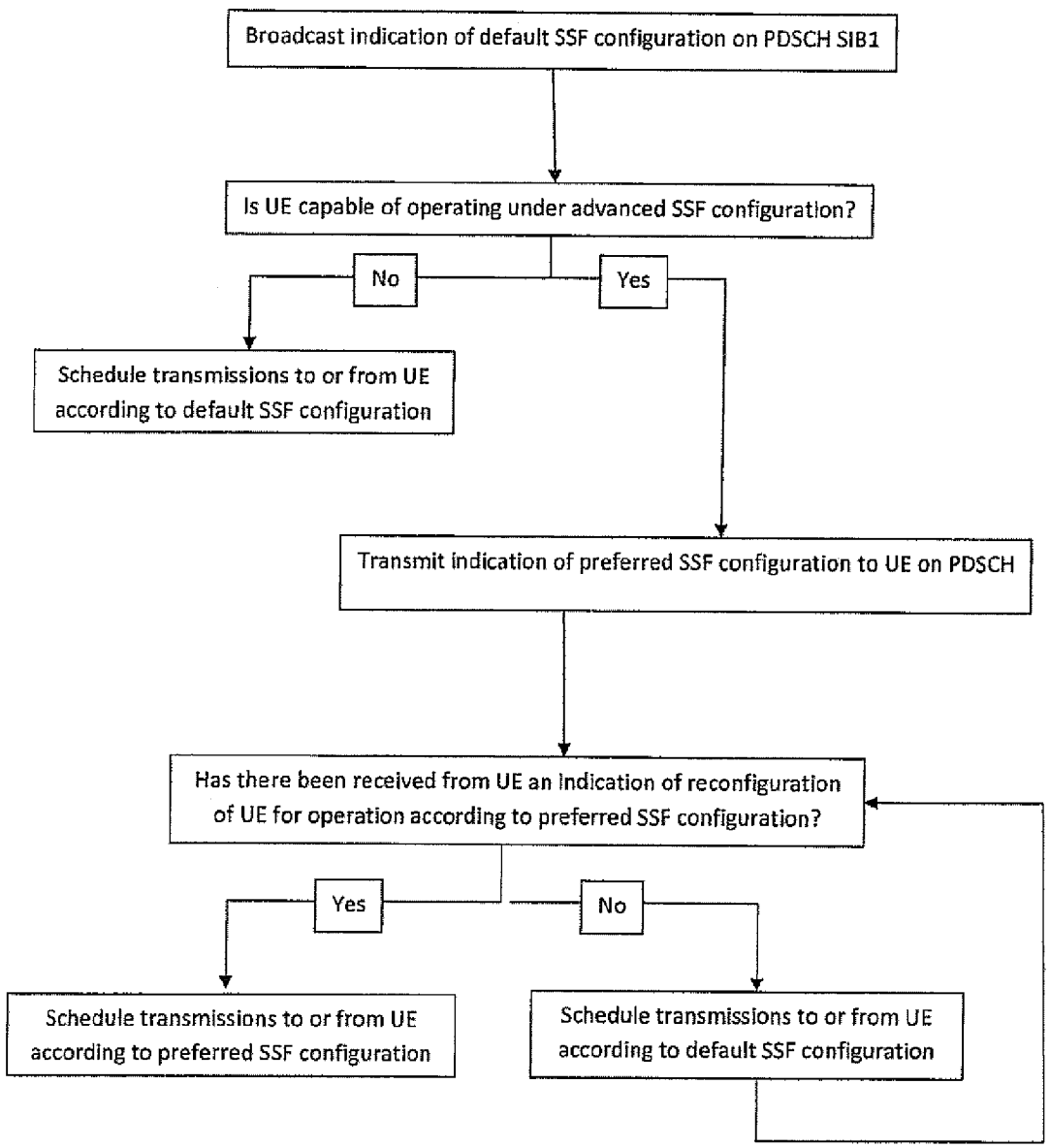
FIG. 4 illustrates one example of operations carried out at an access node of FIG. 1.
Figure 5:
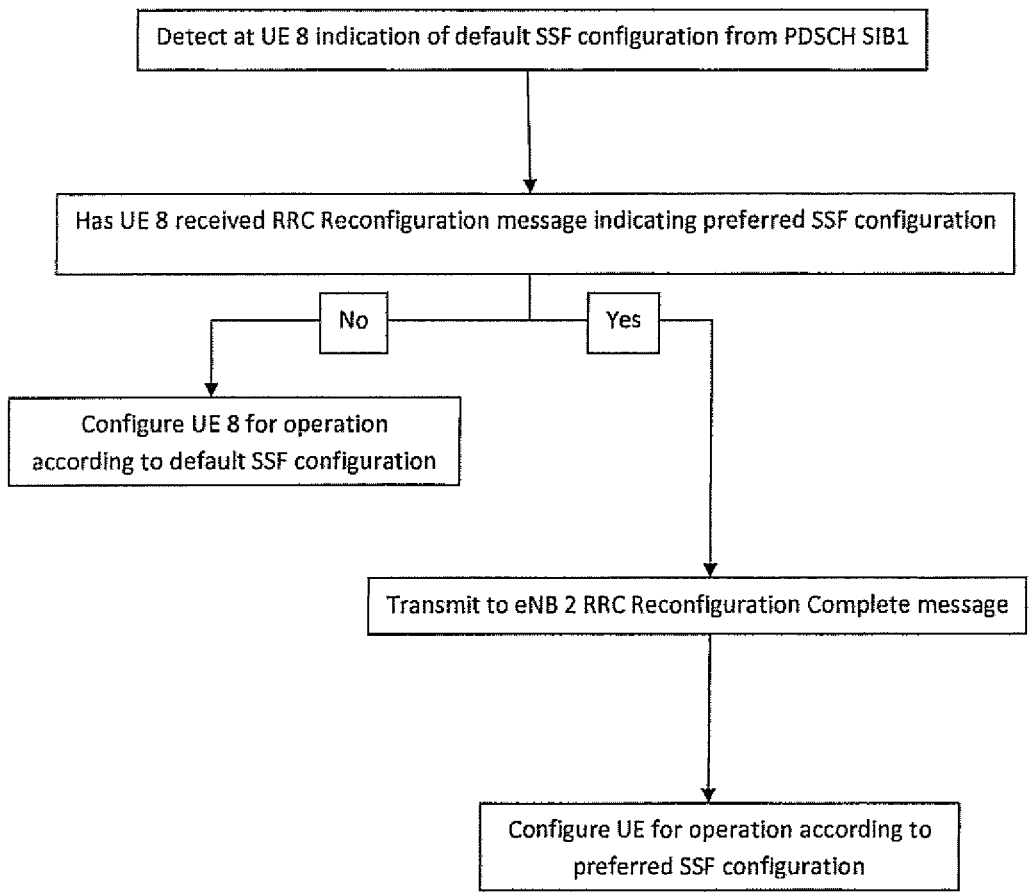
FIG. 5 illustrates one example of operations carried out at a user equipment of FIG. 1.

FIGS. 4 and 5 illustrate one example of operations at the network side and user equipment-side in the communication system of FIG. 1.

Figure 8:
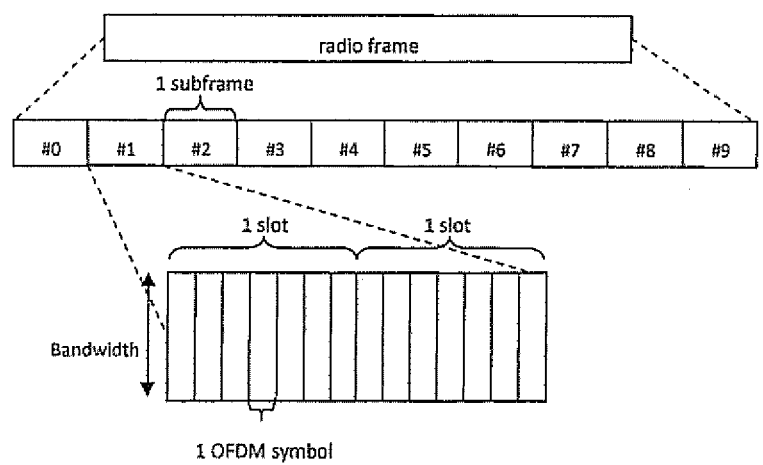
FIG. 8 illustrates an example of the organisation of transmissions to or from an access node of FIG. 1 into frames and sub-frames.

With reference to FIGS. 8 and 9, the set of sub-frames constituting a radio frame are allotted to downlink and uplink transmissions according to one of the 7 configurations shown in FIG. 9; and each uplink-downlink configuration can be seen to include at least one special sub-frame of the kind mentioned above. The slots into which any sub-frame is divided (14 slots in the normal cyclic prefix (CP) case, or 12 slots in the extended cyclic prefix (CP) case) can all be used for transmitting OFDM symbols.

The 14 slots (or 12 slots in the case of using an extended CP) of a special sub-frame (SSF) include: one or more downlink transmission slots at the start of the sub-frame (referred to collectively as the Downlink Pilot Time Slot, (DwPTS)); one or more unused slots in the middle of the sub-frame (referred to collectively as the Guard Period (GP)); and one or more uplink transmission slots at the end of the sub-frame (referred to collectively as the Uplink Pilot Time Slot, (UpPTS)).

Nine different combinations of DwPTS, GP and UpPTS are illustrated in FIG. 10, where the length of the DwPTS and UpPTS are expressed in terms of numbers of OFDM symbols. Further examples of combinations of DwPTS, GP and UpPTS for a special subframe are illustrated in FIG. 11.

The access network decides to adopt a SSF configuration that is not included in the set of SSF configurations shown in FIG. 10 as the preferred SSF configuration for the cell associated with eNB 2. For example, the access network decides to adopt the (6, 6, 2) SSF configuration shown at the top of FIG. 11 as the preferred configuration for the cell associated with eNB 2. (6, 6, 2) refers to the length of the DwPTS, GP and UpPTS, respectively, in terms of numbers of OFDM symbols.

The access network selects from the limited number of special subframe configurations illustrated at FIG. 10 a default SSF configuration to pair with the preferred SSF configuration. One or more of the SSF configurations illustrated at FIG. 10 might be paired with one or more additional SSF configurations of the kind illustrated at FIG. 11, In other words, the additional SSF configurations of the kind illustrated at FIG. 11 may include two or more that are paired with the same default SSF configuration.

In this embodiment, the access network selects from the limited number of special subframe configurations illustrated at FIG. 10 a SSF configuration having a DwPTS and UpPTS that are each no longer than the DwPTS and UpPTS, respectively, of the preferred configuration (6, 6, 2). For example, the access network selects the (3, 9, 2) configuration identified by special sub-frame parameter (SSP) value 5.

The access network formulates a "TDD-Config" information element of the kind illustrated in FIG. 12 and specifying the value "5" for the SSP value, or any other SSP value identifying a default SSF configuration that the network or base station has paired with the preferred SSF configuration. The TDD-Config information element also specifies one of the uplink-downlink configurations illustrated in FIG. 9 by means of one of the 7 subframe assignment (sa) values identified in FIG. 9. The eNB 2 broadcasts the TDD Config information element as part of a system 2.0 information block 1 (SIB1) message of the kind illustrated in FIG. 13 on the Physical Downlink Shared Channel (PDSCH) in conjunction with a downlink control information (DCI) message transmitted on the Physical Downlink Control Channel (PDCCH) indicating resource allocation for the PDSCH transmission (STEP 402). This DCI message is scrambled with the Radio Network Temporary Identifier (RNTI) for the system information, i.e. SI-RNTI. This TDD Config information element is detectable by all UEs 8 (STEP 502). The UEs 8 all find the DCI message with the SI-RNTI as a result of a blind search of the PDCCH, and all obtain from the DCI message the configuration of the corresponding PDSCH carrying the SIB1.

The following Table 1 provides an explanation of the fields used in the system information block 1 (SIB1) message illustrated in FIG. 13.

TABLE 1

| SystemInformationBlockType1 field descriptions |
|---|
| plmn-IdentityList |
| List of Public Land Mobile Network (PLMN) identities. The first listed PLMN-Identity is the primary PLMN.<br>cellReservedForOperatorUse |
| As defined in TS 36.304.<br>trackingAreaCode |
| A trackingAreaCode that is common for all the PLMNs listed.<br>cellBarred |
| 'barred' means the cell is barred, as defined in TS 36.304.<br>intraFreqReselection |
| Used to control cell reselection to intra-frequency cells when the highest ranked cell is barred, or treated as barred by the UE, as specified in TS 36.304.<br>csg-Indication |
| If set to TRUE the UE is only allowed to access the cell if the Closed Subscriber Group (CSG) identity matches an entry in the CSG whitelist that the UE has stored.<br>q-RxLevMinOffset |
| Parameter $Q_{rxlevminoffset}$ in TS 36.304. Actual value $Q_{rxlevminoffset}$ = IE value * 2 [dB]. If absent, the UE applies the (default) value of 0 dB for $Q_{rxlevminoffset}$. Affects the minimum required Rx level in the cell.<br>p-Max |
| Value applicable for the cell. If absent the UE applies the maximum power according to the UE capability.<br>freqBandIndicator |
| Defined in TS 36.101 [table 5.5-1].<br>si-Periodicity |
| Periodicity of the Si-message in radio frames, such that rf8 denotes 8 radio frames, rf16 denotes 16 radio frames, and so on.<br>sib-MappingInfo |
| List of the system information blocks (SIBs) mapped to this SystemInformation message. There is no mapping information of SIB2; it is always present in the first SystemInformation message listed in the schedulingInfoList list.<br>si-WindowLength |
| Common system information (SI) scheduling window for all SIs. Unit in milliseconds, where ms1 denotes 1 millisecond, ms2 denotes 2 milliseconds and so on.<br>systemInfoValueTag |
| Common for all SIBs other than master information block (MIB), SIB1, SIB10, SIB11 and SIB12. Change of MIB and SIB1 is detected by acquisition of the corresponding message.<br>csg-Identity |
| Identity of the Closed Subscriber Group within the primary PLMN the cell belongs to. The field is present in a CSG cell.<br>ims-EmergencySupport |
| Indicates whether the cell supports IP Multimedia Susbystem (IMS) emergency bearer services for UEs in limited service mode. If absent, IMS emergency call is not supported by the network in the cell for UEs in limited service mode.<br>q-QualMin |
| Parameter "$Q_{qualmin}$" in TS 36.304. If cellSelectionInfo-v920 is not present, the UE applies the (default) value of negative infinity for $Q_{qualmin}$.<br>q-QualMinOffset |
| Parameter "$Q_{qualminoffset}$" in TS 36.304. Actual value $Q_{qualminoffset}$ = IE value [dB]. If cellSelectionInfo-v920 is not present or<br>the field is not present, the UE applies the (default) value of 0 dB for $Q_{qualminoffset}$. Affects the minimum required quality level in the cell. |

| Conditional presence | Explanation |
|---|---|
| TDD | This field is mandatory present for TDD; it is not present for FDD and the UE shall delete any existing value for this field. |

The eNB 2 determines whether a UE 8 is one that is capable of operating according to the preferred configuration (STEP 404). If the result of this determination is positive, the access network also formulates a "RRC Connection Reconfiguration" message addressed to that UE 8 and including a "PhysicalConfigDedicated" information element of the kind illustrated in FIG. 14 and specifying the preferred sub-frame configuration e.g. (6, 6, 2) by means of a pre-defined new SSF pattern parameter value (such as e.g. ssp#9 for the (6, 6, 2) configuration) recognisable to the UE 8 to which the message is directed.

Table 2 below provides a description of the fields of the PhysicalConfigDedicated information element illustrated in FIG. 14.

TABLE 2

PhysicalConfigDedicated field descriptions antennaInfo

A choice is used to indicate whether the antennaInfo is signalled explicitly or set to a default antenna configuration.
tpc-PDCCH-ConfigPUCCH Physical Downlink Control Channel (PDCCH) configuration for power control of Physical Uplink Control Channel (PUCCH) using format 3/3A, see TS 36.212.
tpc-PDCCH-ConfigPUSCH PDCCH configuration for power control of Physical Uplink Shared Channel (PUSCH) using format 3/3A, see TS 36.212.
NewSSFpattern Indicate the preferred SSF pattern (e,g, ssp#9) that an advanced UE should follow.

The eNB 2 sends the RRC Connection Reconfiguration message to the UE 8 on the Physical Downlink Shared Channel (PDSCH) in conjunction with a DCI message transmitted on PDCCH and scrambled with the RNTI assigned to the UE 8 for its time in the cell (i.e. C-RNTI) (STEP 408). The UE 8 finds this DCI message with its C-RNTI as the result of a blind search of the PDCCH, and obtains from the DCI message the configuration of the corresponding PDSCH carrying the RRC Connection Reconfiguration message.

In this way, the eNB 2 only sends an indication of the preferred SSF configuration to those UEs 8 that have the capability to operate according to the preferred SSF configuration. If the result of the above-mentioned determination is negative for any UE, the eNB2 schedules transmissions to and/or from any such UE 8 according to the default SSF configuration (STEP 406).

Those UEs 8 to which the eNB 2 does not send an indication of the preferred SSF configuration configure themselves for operation in accordance with the configuration specified in the TDD-Config information element of the SIB1 message detected on PDSCH (STEP 506).

Those UEs 8 that do receive a RRC Connection Reconfiguration message including an indication of the preferred SSF configuration refrain from reconfiguring themselves for operation in accordance with the preferred SSF configuration at least until after sending out a RRC Connection Reconfiguration Complete message to the eNB 2 (STEP 508). Until eNB 2 receives the RRC Reconfiguration Complete message from the UE 8, eNB 2 continues to schedule transmissions to the UE 8 according to the default SSF configuration (STEP 414). After receiving the RRC Connection Reconfiguration Complete message from the UE 8, eNB 2 begins scheduling transmissions to that UE 8 in accordance with the preferred SSF configuration (STEP 412).

For the period of uncertainty between the UE 8 sending out the RRC Connection Reconfiguration Complete message and the eNB 2 receiving this message, the UE 8 can continue to operate according to the default SSF configuration specified in the TDD-Config information element, whilst at the same time checking for detection of OFDM symbols on the additional time resources allotted to downlink transmissions as part of the preferred SSF configuration (6, 6, 2).

Figure 6:
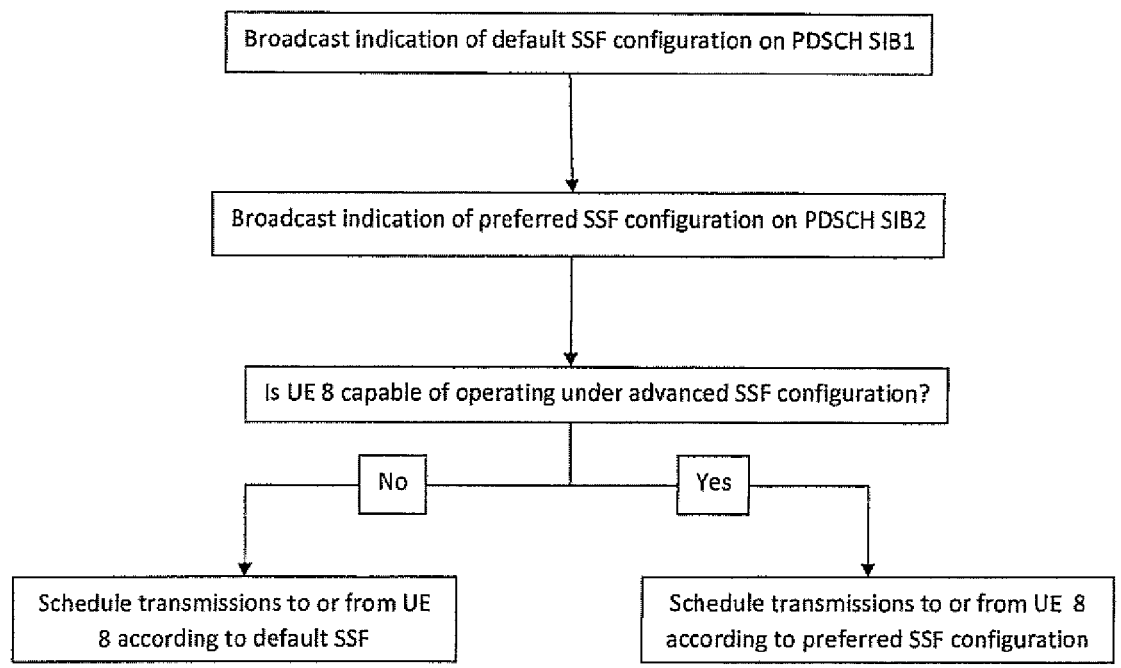
FIG. 6 illustrates another example of operations carried out at an access node of FIG. 1.
Figure 7:
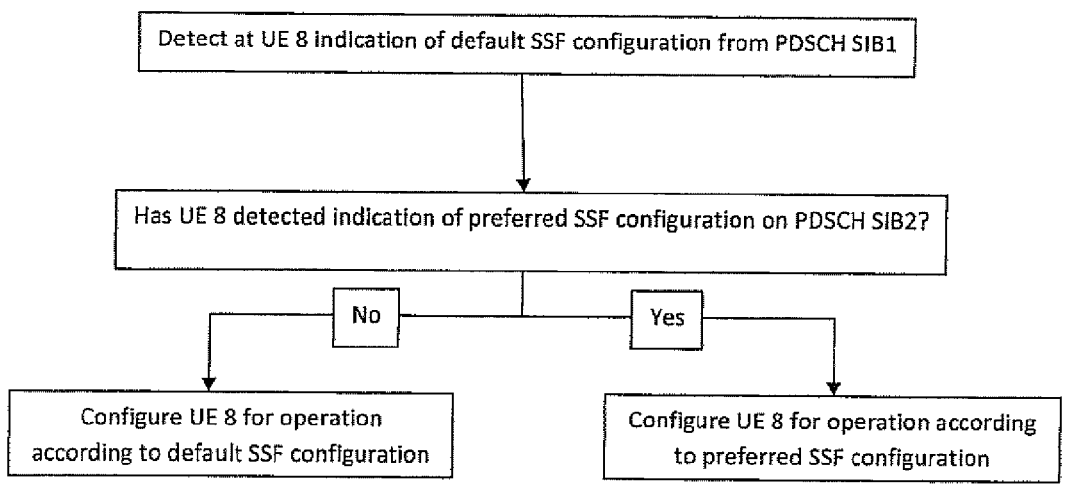
FIG. 7 illustrates another example of operations carried out at a user equipment of FIG. 1.

FIGS. 6 and 7 illustrate another example of operations at the network-side and user equipment-side according to one alternative technique. As in the technique described above, the eNB 2 broadcasts an indication of the default SSF configuration on PDSCH as part of SIB1 (STEP 602), which is detected by all UEs 8 (STEP 702). The eNB 2 also includes an indication of the preferred (6, 6, 2) SSF configuration as part of a second system information block message on broadcast channel PDSCH in conjunction with a DCI message transmitted on the PDCCH and indicating resource allocation of the PDSCH transmission. The DCI message is scrambled with the above-mentioned SI-RNTI (STEP 604). One example of such a message is a System Information Block Type 2 (SIB2) message of the kind illustrated in FIG. 15. The indication of the preferred configuration is broadcast on PDSCH in such a way that it is not recognisable to those UEs 8 unable to operate in accordance with the preferred SSF configuration; and such UEs 8 continue to configure themselves for operation in accordance with the default SSF configuration specified in the TDD-Config information element (STEP 706).

Table 3 below provides an explanation of the fields of the System Information Block Type 2 message illustrated in FIG. 15.

TABLE 3

SystemInformationBlockType2 field descriptions ac-BarringForEmergency

Access class barring for AC 10.
ac-BarringForMO-Signalling

Access class barring for mobile originating signalling.
ac-BarringForMO-Data

Access class barring for mobile originating calls.
ac-BarringFactor

TABLE 3-continued

SystemInformationBlockType2 field descriptions

If the random number drawn by the UE is lower than this value, access is allowed. Otherwise the access is barred. The values are interpreted in the range [0, 1): p00 = 0, p05 = 0.05, p10 = 0.10, . . . , p95 = 0.95.
ac-BarringTime Mean access barring time value in seconds.
ac-BarringForSpecialAC Access class barring for AC 11-15. The first/leftmost bit is for AC 11, the second bit is for AC 12, and so on.
ul-CarrierFreq For FDD: If absent, the (default) value determined from the default TX-RX frequency separation defined in TS 36.101 [table 5.7.3-1] applies.
For TDD: This parameter is absent and it is equal to the downlink frequency.
ul-Bandwidth Parameter: transmission bandwidth configuration, $N_{RB}$, in uplink, see TS 36.101 [table 5.6-1]. Value n6 corresponds to 6 resource blocks, n15 to 15 resource blocks and so on. If for FDD this parameter is absent, the uplink bandwidth is equal to the downlink bandwidth. For TDD this parameter is absent and it is equal to the downlink bandwidth.
mbsfn-SubframeConfigList Defines the subframes that are reserved for Multimedia Broadcast multicast service Single Frequency Network (MBSFN) in downlink.
ssac-BarringForMMTEL-Voice Service specific access class barring for Multimedia Telephony (MMTEL) voice originating calls.
ssac-BarringForMMTEL-Video Service specific access class barring for MMTEL video originating calls.
NewSSFpattern Indicate the new SSF pattern (e.g. ssp#9) that advanced UE should follow.

Those UEs 8 that are capable of detecting the indication of the preferred SSF configuration on PDSCH SIB2 and can operate in accordance with the preferred (6, 6, 2) configuration immediately reconfigure themselves accordingly (STEP 708); and the eNB 2 also begins immediately scheduling transmissions to such UEs according to the preferred (6, 6, 2) SSF configuration (STEP 610). As mentioned above, the eNB 2 is able to differentiate between those UEs 8 that can operate in accordance with the preferred SSF configuration and those that cannot; and for those UEs that do not have the capability to operate in accordance with the preferred SSF configuration, the eNB 2 schedules transmissions to and/or from such UE 8 according to the default SSF configuration broadcast on PDSCH SIB1 (STEP 608).

For the purpose of making measurements on eNBs associated with neighbouring cells (i.e. potential target cells), the UE 8 makes such measurements on the basis of the default SSF configuration (e.g. (3, 9, 2) in the example given above), i.e. it only makes measurements on the slots allotted to DwPTS according to the default SSF configuration. For the purpose of making measurements on the eNB 2 associated with the current cell, a UE 8 capable of operating according to the preferred SSF configuration (e.g. (6, 6, 2) in the example given above) makes measurements on the slots allotted to the DwPTS according to the preferred SSF configuration, including any additional slots that are not allotted to DwPTS in the default SSF configuration.

The above description refers to the example of a preferred SSF configuration having increased time resources for DwPTS and the same time resources for UpPTS. However, the same kind of technique is also applicable to preferred SSF configurations having increased time resources for both DwPTS and UpPTS, and preferred SSF configurations having increased time resources for UpPTS and the same time resources for DwPTS. As mentioned above, the access network selects from the set of SSF configurations illustrated in FIG. 10 a default SSF configuration having time resources for DwPTS and UpPTS that are no longer than the respective time resources in the preferred SSF configuration.

The above-described operations may require data processing in the various entities. The data processing may be provided by means of one or more data processors.

Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

For example the embodiments may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described techniques may be made, and that the described techniques have application in other communication systems.

The invention claimed is:

1. A method, comprising:
   transmitting, to at least one communication device, a message comprising an indication of a first configuration and an indication of a second configuration for a sub-frame having a downlink transmission portion and an uplink transmission portion;
   based on the message, scheduling at least one of transmissions to and transmissions from a communication device of the at least one communication device according to said second sub-frame configuration; and
   selecting for said first sub-frame configuration a configuration that fulfils at least one predefined condition in relation to the second sub-frame configuration, wherein a predefined condition of said at least one predefined condition is that both uplink and downlink transmission portions of said sub-frame according to said second sub-frame configuration respectively include at least time resources allotted to the uplink and downlink transmission portions of said sub-frame according to said first sub-frame configuration.

2. The method according to claim 1, comprising broadcasting said indication of said second sub-frame configuration to the at least one communication device, wherein the broadcasting is in a format that is only detectable by a communication device of the at least one communication device that is capable of operating in accordance with said second sub-frame configuration.

3. The method according to claim 1, wherein the message comprises a first information element and a second information element, and wherein the first sub-frame configuration is indicated in the first information element of the message and the second sub-frame configuration is indicated in the second information element of the message, or vice versa.

4. The method according to claim 1, wherein a preferred configuration is providing increased time resources to the at least one communication device for at least one of an uplink pilot time slot and a downlink pilot time slot of the at least one of the transmissions to and the transmissions from the communication device.

5. A computer program product comprising a non-transitory computer readable medium comprising program code which when loaded into a computer controls the computer to perform the method in claim 1.

6. The method according to claim 1, wherein the at least one communication device is associated with an access network, wherein the first sub-frame configuration for the sub-frame is a default configuration for the access network, and wherein the second sub-frame configuration for the sub-frame is a preferred configuration for the access network.

7. A method, comprising:
   detecting, by at least one communication device, a message comprising an indication of a first configuration and an indication of a second configuration for a sub-frame having a downlink transmission portion and an uplink transmission portion, wherein said first sub-frame configuration is a configuration that fulfils at least one predefined condition in relation to the second sub-frame configuration; and
   based on the message, configuring a communication device of the at least one communication device for operation according to said second sub-frame configuration, wherein a predefined condition of said at least one predefined condition is that both uplink and downlink transmission portions of said sub-frame according to said second sub-frame configuration respectively include at least time resources allotted to the uplink and downlink transmission portions of said sub-frame according to said first sub-frame configuration.

8. The method according to claim 7, comprising detecting said indication of said second subframe configuration from a broadcast channel.

9. The method according to claim 7, wherein the message comprises a first information element and a second information element, and wherein the first sub-frame configuration is indicated in the first information element of the message and the second sub-frame configuration is indicated in the second information element of the message, or vice versa.

10. The method according to claim 7, wherein the downlink transmission portion of said sub-frame according to said second sub-frame configuration includes additional time resources; and wherein the method further comprises:
    after configuring said communication device of the at least one communication device for operation according to said first subframe configuration, carry out one or more measurements for downlink data symbols on said additional time resources.

11. A computer program product comprising a non-transitory computer readable medium comprising program code which when loaded into a computer controls the computer to perform the method in claim 7.

12. An apparatus comprising:
    a processor and memory including computer program code, wherein the memory and computer program code are configured to, with the processor, cause the apparatus to:
    transmit, to at least one communication device, a message comprising an indication of a first configuration and an indication of a second configuration for a sub-frame having a downlink transmission portion and an uplink transmission portion; and
    based on the message, schedule at least one of transmissions to and transmissions from a communication device of the at least one communication device according to said second sub-frame configuration; and
    select for said first sub-frame configuration a configuration that fulfils at least one predefined condition in relation to the second sub-frame configuration, wherein a predefined condition of said at least one predefined condition is that both uplink and downlink transmission portions of said sub-frame according to said second sub-frame configuration respectively include at least time resources allotted to the uplink and downlink transmission portions of said sub-frame according to said first sub-frame configuration.

13. The apparatus according to claim 12, wherein the memory and computer program code are configured to, with the processor, cause the apparatus to broadcast said indication of said second sub-frame configuration to the at least one communication device, wherein the broadcasting is in a format that is only detectable to a communication device of the at least one communication device capable of operating in accordance with said second sub-frame configuration.

14. The apparatus according to claim 12, wherein the message comprises a first information element and a second information element, and wherein the first sub-frame configuration is indicated in the first information element of the message and the second sub-frame configuration is indicated in the second information element of the message, or vice versa.

15. The apparatus according to claim 12, wherein the memory and computer program code are configured to, with the processor, cause the apparatus to: transmit, to the at least one communication device, said indication of said second subframe configuration as part of an information block not including said indication of said first subframe configuration.

16. An apparatus comprising:
a processor and memory including computer program code, wherein the memory and computer program code are configured to, with the processor, cause the apparatus to:
receive a message comprising an indication of a first configuration and an indication of a second configuration for a sub-frame having a downlink transmission portion and an uplink transmission portion, wherein said first sub-frame configuration is a configuration that fulfils at least one predefined condition in relation to the second sub-frame configuration; and
based on the message, operate a communication device according to either said first sub-frame configuration or said second sub-frame configuration, wherein a predefined condition of said at least one predefined condition is that both uplink and downlink transmission portions of said sub-frame according to said second sub-frame configuration respectively include at least time resources allotted to the uplink and downlink transmission portions of said sub-frame according to said first sub-frame configuration.

17. The apparatus according to claim 16, wherein the memory and computer program code are configured to, with the processor, cause the apparatus to: detect said message comprising said indication of said second subframe configuration from a broadcast channel.

18. The apparatus according to claim 16, wherein the message comprises a first information element and a second information element, and wherein the first sub-frame configuration is indicated in the first information element of the message and the second sub-frame configuration is indicated in the second information element of the message, or vice versa.

19. The apparatus according to claim 16, wherein the downlink transmission portion of said sub-frame according to said second sub-frame configuration includes additional time resources; and wherein the memory and computer program code are configured to, with the processor, cause the apparatus to: after configuring said communication device for operation according to said first subframe configuration, carry out one or more measurements for downlink data symbols on said additional time resources.

* * * * *